United States Patent
Pranam et al.

(10) Patent No.: US 10,547,612 B2
(45) Date of Patent: Jan. 28, 2020

(54) SYSTEM TO RESOLVE MULTIPLE IDENTITY CRISIS IN INDENTITY-AS-A-SERVICE APPLICATION ENVIRONMENT

(71) Applicant: International Business Machines Corporation, Armonk, NY (US)

(72) Inventors: Sreedhar C. Pranam, London (GB); Patrick R. Wardrop, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 15/272,076

(22) Filed: Sep. 21, 2016

(65) Prior Publication Data
US 2018/0083940 A1    Mar. 22, 2018

(51) Int. Cl.
*H04L 9/32* (2006.01)
*H04L 29/06* (2006.01)
*H04L 29/12* (2006.01)

(52) U.S. Cl.
CPC ................. *H04L 63/0876* (2013.01)

(58) Field of Classification Search
None
See application file for complete search history.

(56) References Cited

U.S. PATENT DOCUMENTS

| | | | |
|---|---|---|---|
| 8,646,060 B1 * | 2/2014 | Ben Ayed | H04L 63/0853 726/9 |
| 8,931,038 B2 * | 1/2015 | Pulier | G06F 9/45558 709/226 |
| 9,191,215 B2 | 11/2015 | Chiviendacz et al. | |
| 9,294,478 B2 | 3/2016 | Von Bokern et al. | |
| 2002/0029278 A1 * | 3/2002 | Shiouchi | H04L 63/0823 709/229 |
| 2012/0209735 A1 | 8/2012 | Subramanian et al. | |
| 2013/0054433 A1 * | 2/2013 | Giard | H04L 67/22 705/34 |
| 2013/0282580 A1 | 10/2013 | O'Brien et al. | |
| 2015/0113631 A1 | 4/2015 | Lerner et al. | |
| 2015/0161378 A1 | 6/2015 | Oberheide et al. | |
| 2015/0222619 A1 | 8/2015 | Hughes et al. | |

(Continued)

OTHER PUBLICATIONS

Cloud identity management security issues & solutions: a taxonomy. Habiba et al. www.casmodeling.com (Year: 2014).*

(Continued)

*Primary Examiner* — Venkat Perungavoor
(74) *Attorney, Agent, or Firm* — Cantor Colburn LLP; Jeffrey S LaBaw

(57) ABSTRACT

According to a non-limiting embodiment, a multiple identity resolution system includes an IDaaS integrated with a PaaS. The IDaaS is integrated with a cloud-based network, and an application module installed in the cloud-based network. The application module is configured to deliver content to at least one electronic device. The multiple identity resolution system further includes a service module in signal communication with the application module. The service module is configured to identify a physical user operating the at least one electronic device based on at least one user authentication credential received by the at least one electronic user device and at least one device attribute of the at least one electronic device.

16 Claims, 12 Drawing Sheets

| Device Attribute(s) | Identification source | Application Accessed | Application User ID | |
|---|---|---|---|---|
| - IP address = 202.187.3.4<br>- Smart Phone<br>- Browser = Firefox<br>- Device Location = Singapore | Identification Source 3 (308c) | Application 1 | userA@domain1.com | Table 1 |

500a, 502, 504, 506, 508

(56) References Cited

U.S. PATENT DOCUMENTS

| | | | |
|---|---|---|---|
| 2015/0324563 A1 | 11/2015 | Deutschmann et al. | |
| 2016/0248759 A1* | 8/2016 | Tsurumi | G06F 21/41 |
| 2016/0269381 A1* | 9/2016 | Paul | H04L 63/08 |
| 2016/0269400 A1* | 9/2016 | Glaser | H04L 63/0861 |
| 2016/0315965 A1* | 10/2016 | Sastry | H04L 63/20 |
| 2016/0380988 A1* | 12/2016 | Goel | H04L 63/08 726/7 |
| 2018/0324151 A1* | 11/2018 | Talmor | G06Q 20/32 |

OTHER PUBLICATIONS

Auth0, [online]; [retrieved on Sep. 10, 2018]; retrieved from the Internet https://auth0.com/docs/link-accounts; "Linking User Accounts," 12 pages.

Hull, [online]; [retrieved on Sep. 10, 2018]; retrieved from the Internet https://www.hull.io/help/social-login/; "Social Login," 5 pages.

\* cited by examiner

500a

| Device Attribute(s) | Identification source | Application Accessed | Application User ID |
|---|---|---|---|
| - IP address = 202.187.3.4<br>- Smart Phone<br>- Browser = Firefox<br>- Device Location = Singapore | Identification Source 3 (308c) | Application 1 | userA@domain1.com |

Table 1

| Device Attribute(s) | Identification source | Application Accessed | Application User ID |
|---|---|---|---|
| - IP address = 202.187.3.4<br>- Smart Phone<br>- Browser = Firefox<br>- Device Location = Singapore | Identification Source 3 (308c) | Application 1 | userA@domain1.com |
| - IP address = 202.187.3.4<br>- Smart Phone<br>- Browser = Firefox<br>- Device Location = Singapore | Identification Source 2 (308b) | Application 1 | userA@domain2.com |

Table 2

FIG. 5B

Table 3

| Device Attribute(s) | Identification source | Application Accessed | Application User ID |
|---|---|---|---|
| - IP address = 202.187.3.4<br>- Smart Phone<br>- Browser = Firefox<br>- Device Location = Singapore | Identification Source 3 (308c) | Application 1 (306a) | userA@domain1.com |
| - IP address = 202.187.3.4<br>- Smart Phone<br>- Browser = Firefox<br>- Device Location = Singapore | Identification Source 2 (308b) | Application 1 (306) | userA@domain2.com |
| - IP address = 202.187.3.4<br>- Smart Phone<br>- Browser = Firefox<br>- Device Location = Singapore | Identification Source 1 (308a) | Application 2 (306b) | userA@domain3.com |

FIG. 5C

| Device Attribute(s) | Identification source | Application Accessed | Application User ID |
|---|---|---|---|
| - IP address = 202.187.3.4<br>- Smart Phone<br>- Browser = Firefox<br>- Device Location = Singapore | Identification Source 3 (308c) | Application 1 (306a) | userA@domain1.com |
| - IP address = 202.187.3.4<br>- Smart Phone<br>- Browser = Firefox<br>- Device Location = Singapore | Identification Source 2 (308b) | Application 1 (306a) | userA@domain2.com |
| - IP address = 202.187.3.4<br>- Smart Phone<br>- Browser = Firefox<br>- Device Location = Singapore | Identification Source 1 (308a) | Application 2 (306b) | userA@domain3.com |
| - IP address = 202.187.3.9<br>- Desktop Computer<br>- Browser = Firefox<br>- Device Location = Singapore | Identification Source 1 (308a) | Application 3 (306c) | userA@domain3.com |

Table 4

SYSTEM TO RESOLVE MULTIPLE IDENTITY CRISIS IN INDENTITY-AS-A-SERVICE APPLICATION ENVIRONMENT

BACKGROUND

The present invention relates to platform-as-as-service (PaaS) application environments, and more specifically, to identity-as-a-service (IDaaS) applications.

PaaS is a service that provides a platform allowing customers and developers to develop, run, and manage applications without the complexity of building and maintaining the infrastructure typically associated with developing and launching applications, typically referred to as "Apps". Developers integrate applications developed in PaaS with different identity sources for end user authentication. IDaaS is used to ease application development.

Traditional IDaaS assists developers by integrating their applications with various identity sources. The end user of the application can enter different identities from these identity sources to access the application. The ability to use different identity sources makes it more convenient for the user to use different identities to access the same application. However, this use of different identities to access the same application creates an "identity" issue.

SUMMARY

According to a non-limiting embodiment, a multiple identity resolution system includes an IDaaS integrated with a PaaS. The IDaaS is integrated with a cloud-based network, and an application module is installed in the cloud-based network. The application module is configured to deliver content to at least one electronic device. The multiple identity resolution system further includes a service module in signal communication with the application module. The service module is configured to identify a physical user operating the at least one electronic device based on at least one user authentication credential received by the at least one electronic user device and at least one device attribute of the at least one electronic device.

According to another non-limiting embodiment, a method of resolving a multiple identity resolution in a system including an IDaaS integrated with a PaaS comprises requesting access to at least one application module installed in a cloud-based network that is configured to deliver content to at least one electronic device. The method further comprises identifying a physical user operating the at least one electronic device. The identification is based on at least one user authentication credential received from the at least one electronic device and at least one device attribute of the at least one electronic device.

According to yet another non-limiting embodiment, a computer program product comprises a computer readable storage medium having program instructions for resolving a multiple identity resolution in a system including an IDaaS integrated with a PaaS. The program instructions are executable by a processor to perform operations of requesting access to at least one application module installed in a cloud-based network that is configured to deliver content to at least one electronic device. The operations further include identifying a physical user operating the at least one electronic device based on at least one user authentication credential received from the at least one electronic device and at least one device attribute of the at least one electronic device.

Additional features are realized through the techniques of the present invention. Other embodiments are described in detail herein and are considered a part of the claimed invention. For a better understanding of the invention with the features, refer to the description and to the drawings.

BRIEF DESCRIPTION OF THE DRAWINGS

FIGS. 5A, 5B, 5C and 5D are a series of user ID tables that are generated in response to executing different authentications using the IDaaS integrated with the multiple identity resolution system according to non-limiting embodiments;

DETAILED DESCRIPTION

Figure 1A:
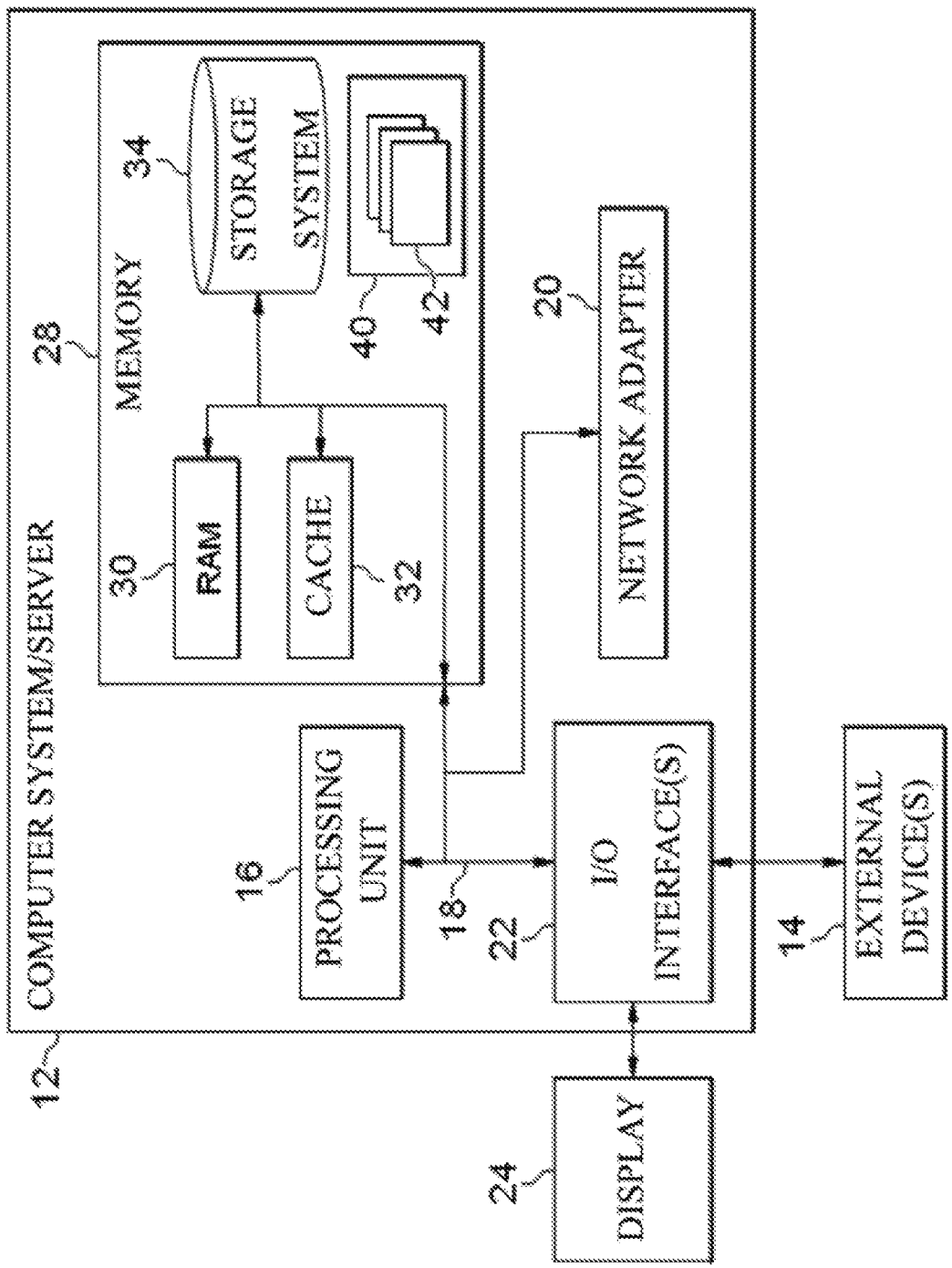
FIG. 1A shows a computer system/server which is applicable to implement various non-limiting embodiments of the present invention.

Referring now to FIG. 1A, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1A, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to microcode, device drivers, redundant processing units, external disk drive arrays, RAID systems, tape drives, and data archival storage systems, etc.

Exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

A cloud computing environment is service oriented with a focus on statelessness, low coupling, modularity, and semantic interoperability. At the heart of cloud computing is an infrastructure comprising a network of interconnected nodes.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software-as-a-Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform-as-a-Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure-as-a-Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Identity-as-a-Service (IDaaS): the capability provided to the consumer is to deploy a cloud-based infrastructure a service that provides a set of identity and access management functions to target systems on customers' premises and/or in the cloud. IDaaS functionality can include, but is not limited to, (I) identity governance and administration ("IGA")—this includes the ability to provision identities held by the service to target applications; (II) Access—this includes user authentication, single sign-on (SSO), and authorization enforcement (III) Intelligence—this includes logging events and providing reporting that can answer questions such as "who accessed what, and when."

Several different IDaaS deployment models can be employed. For instance, (I) "private cloud models" can be implemented where the cloud infrastructure is operated solely for an organization. Private clouds can be managed by the organization or a third party and may exist on-premises or off-premises. (II) The IDaaS can be deployed as a "community cloud model" where the cloud infrastructure is shared by several organizations and supports a specific community that has shared concerns (e.g., mission, security requirements, policy, and compliance considerations). Community cloud models can be managed by the organizations or a third party and may exist on-premises or off-premises. (III) "Public cloud models" can also be employed where the cloud infrastructure is made available to the general public or a large industry group and is owned by an organization selling cloud services. (IV) "Hybrid cloud models" also exist where the cloud infrastructure is a composition of two or more clouds (private, community, or public) that remain unique entities but are bound together by standardized or proprietary technology that enables data and application portability (e.g., cloud bursting for load-balancing between clouds).

Referring now to FIG. 1A, a schematic of an example of a cloud computing node is shown. Cloud computing node 10 shown in FIG. 1A is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules can be located in both local and remote computer system storage media including memory storage devices.

As shown in FIG. 1A, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to microcode, device drivers, redundant processing units, external disk drive arrays, RAID systems, tape drives, and data archival storage systems, etc.

Figure 1B:
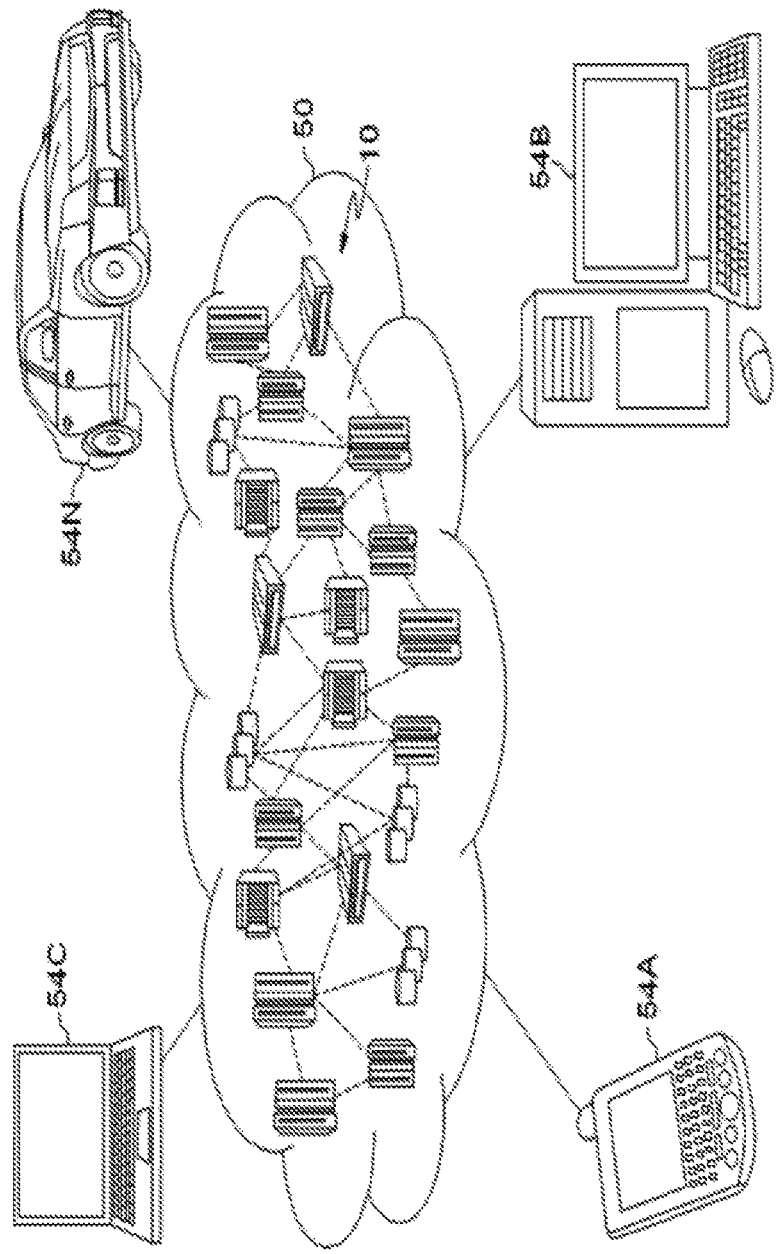
FIG. 1B represents the cloud computing environment according to one embodiment of the present disclosure.
Figure 2:
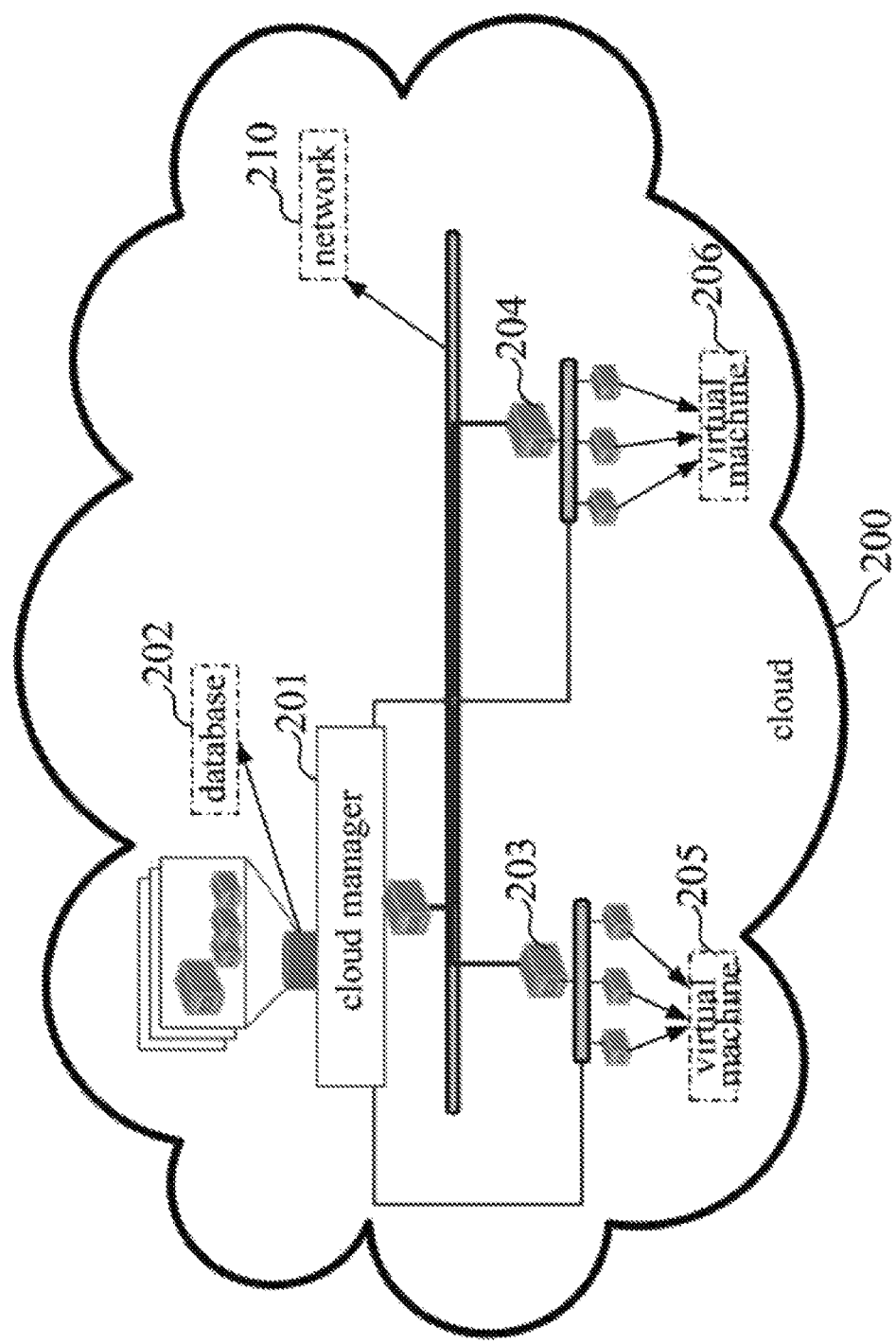
FIG. 2 shows a basic topology of a cloud side applied in the present disclosure.

Referring now to FIG. 1B, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 1C:
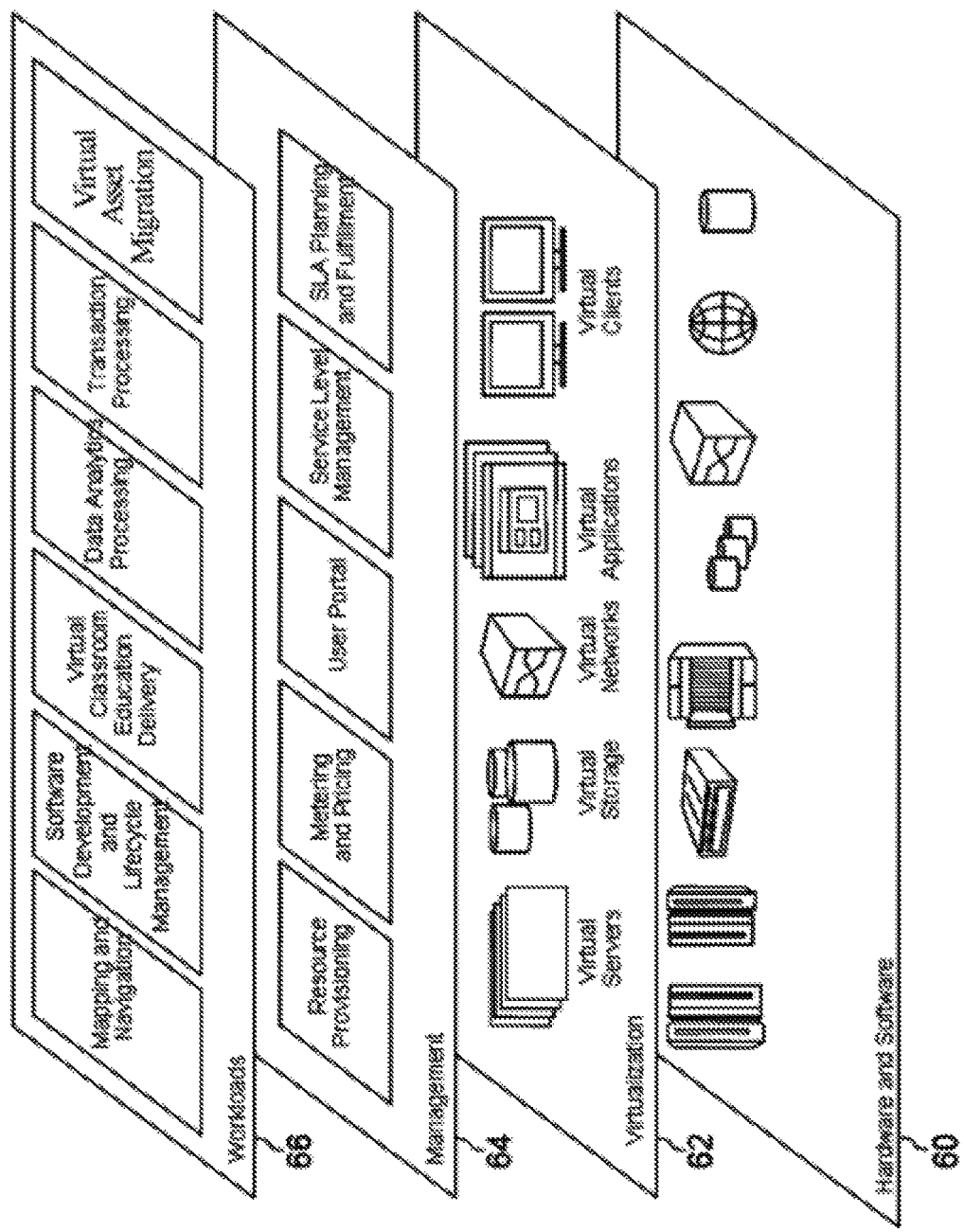
FIG. 1C represents an abstract model layer according to one embodiment of the present disclosure.

Referring now to FIG. 1C, a set of functional abstraction layers provided by cloud computing environment 50 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include mapping and navigation; software development and lifecycle management; virtual classroom education delivery; data analytics processing; transaction processing; and virtual asset migration.

In the following, several terms which may be used in the specification are explained as follows.

Cloud (or cloud side): it consists of a cloud management platform, a physical host managed by the cloud management platform and a VM run on the physical host connected over network.

Cloud computing platform: it is the cloud management platform of entire cloud side, and is used for performing cloud processing such as storing and/or computing, etc. and issuing various instructions to the physical host managed by it. It may also be referred to as "manager" or "cloud manager".

Physical host: it is connected with the cloud manager over network, it is the host machine of a VM, receives various instructions of the cloud manager through a controller agent so as to run, change or stop a VM application thereon, and reports the processing result to the cloud manager.

Virtual Machine (VM): it is an application run on the physical host and may complete various tasks and functions so as to provide cloud services. The above explanation is only exemplary and does not limit the scope of the present disclosure.

FIG. 2 shows a basic topology of a cloud side applied in the present disclosure. The basic topology of the cloud side 200 applied in the present disclosure includes a cloud manager 201, a database 202 of the cloud manager 201, physical hosts 203 and 204 which may be multiple, multiple VMs 205 and 206 which are run on physical hosts so as to provide cloud services, and network 210 which connects the cloud manager 201 and physical hosts 203 and 204 and connects the cloud side 200 with the external network so as to provide the access service.

Figure 3:
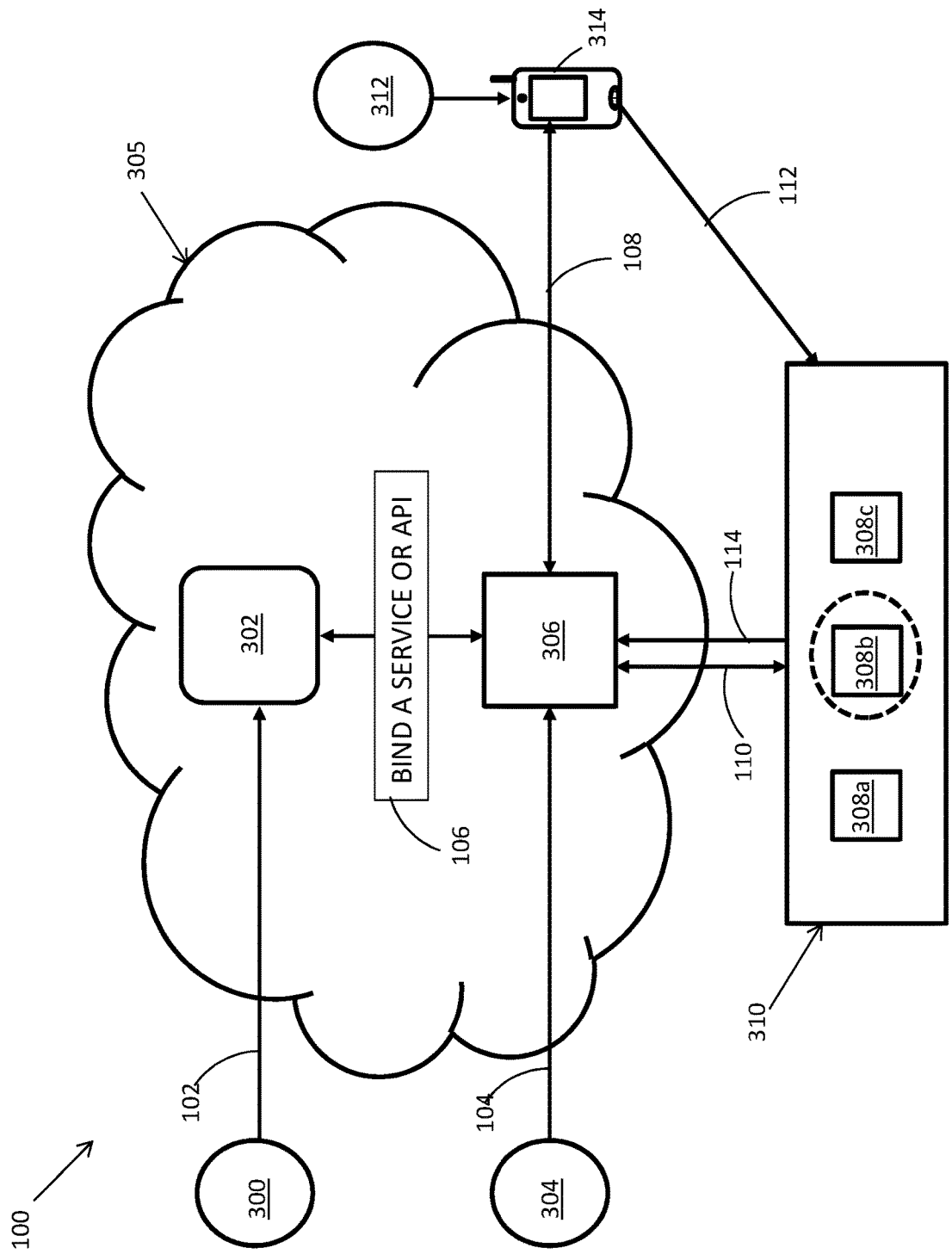
FIG. 3 illustrates a multiple identity resolution system that integrates an IDaaS with a PaaS according to a non-limiting embodiment.

With reference now to FIG. 3, a multiple identity resolution system 100 that integrates an IDaaS with a PaaS is illustrated according to a non-limiting embodiment. At operation 102, an administrator 300 configures an IDaaS module 302, hereinafter referred to as a service 302, which enables a developer 304 to integrate the application 306 with IDaaS module 302, hereinafter referred to as applications 306. The service 302 and the application 306 each can be supported by a cloud-based network 305. Although the administrator 300 and the developer 304 are illustrated as separate entities, it should be appreciated that the administrator 300 and the developer 304 can be a single entity without departing from the scope of the invention.

At operation 104, the developer 304 develops an application 306 capable of delivering various types of content (e.g., news information, music streaming, video streaming, image data, text messaging data, search engine interface, social media data, etc.). The application 306 is configured to integrate multiple identity sources 308a-308c. The integration provides access to application 306 using any of the identity sources 308a-308c. Accordingly, the user 312 can access application 306 after submitting the proper authentication credentials to a respective identity source 308a-308c. Although one application 306 is illustrated, it should be appreciated that additional applications may be integrated with the service 302. For instance, a first application can be developed that assists in booking hotels and bread & breakfasts, while a second application can be developed that provides a music streaming service to the user 312.

One or more of the applications 306 may allow the user 312 to create multiple accounts, or allow the user 312 to link different identity sources to a particular application 306. The user 312 may have several incentives to create multiple accounts for a particular application 306. For example, the music streaming application may offer 1000 hours of free streaming music to first time users. Therefore, a user 312 may attempt to create several different accounts using different user IDs or use different identity sources to gain as much free streaming music as possible. However, each created account for a particular application 306 results in a different account User ID. To solve this multiple identity issue, at least one embodiment of the invention identifies device attributes of a device 314 used to activate the application 306. The device 314 attributes can then be mapped to the various user authentication credentials input to the identity sources 308a-308c.

The various identity sources 308a-308c requests a user to input the proper authentication credentials (e.g., a username, email address, password, etc.). The identity sources 308a-308c are provided by various companies or service organizations and are utilized by the multiple identity resolution system 100 by requiring the user 312 to submit authentication credentials corresponding to a respective identity source 308a-308c before granting the user 312 access to the application 306.

The identity sources 308a-308c can be supported in an ID source registry module 310 that is accessible by the application 306. The ID source registry module 310 may be implemented as a storage device or memory capable of storing identity sources 308a-308c registered to the user 312. Although the ID source registry module 310 is illustrated as being located externally from the cloud 305, it should be appreciated that the ID source registry module 310 can be included with the application 306 in the cloud 305 without departing from the scope of the invention.

At operation 106, the application 306 is bound or integrated with the service 302. For instance, an application programming interface (API) can be established that includes a set of subroutine definitions, protocols, tools, etc., which link the application 306 to available tasks defined the service 302. The service 302 may include its own computing platform that performs logic and computer functionality to facilitate the operations and goals defined by the service 302. For instance, a computing platform by the service 302 may perform various logical comparisons, and storage operations upon the user identification data, device attribute data, etc.

Once the service 302 and the application 306 are established and integrated, the identity sources 308a-308c can be made available to an end user 312. Accordingly, the end user 312 (e.g., service subscriber 312) can invoke the application 306 at operation 108 and request authentication to access the application 306. A variety of electronic devices 314 can be utilized by the user 312 including, but not limited to, a mobile terminal device (e.g., a wireless smart phone, tablet computer, phablet, etc.), a laptop computer, a desktop computer, a vehicle infotainment system, or any other suitable electronic device capable of communicating with the cloud network 305.

At operation 110, the application 306 analyzes the ID source registry module 310. Based on the contents of the ID source registry module 310, the application 306 presents the user 312 with one or more available identity sources 308a-308c. Because the application 306 is capable of communicating with the ID source registry module 310, the application 306 is aware of the various identity sources 308a-308c.

Turning to operation 112, the user 312, via manipulation of device 314, selects a desired identity source (e.g., indicated by the dashed highlighting around source 308b) among the available identity sources 308a-308c, and inputs the proper authentication credentials (e.g., a username, email address, password, etc.) corresponding to the selected identity source (e.g., 308b). The user's input credentials are then relayed to the ID source registry module 310, and are authenticated by a server (not shown) corresponding to the selected identity sources 308b. Once the user's credentials are verified at operation 114, the user is authenticated and is granted access to the application 306.

Figure 4:
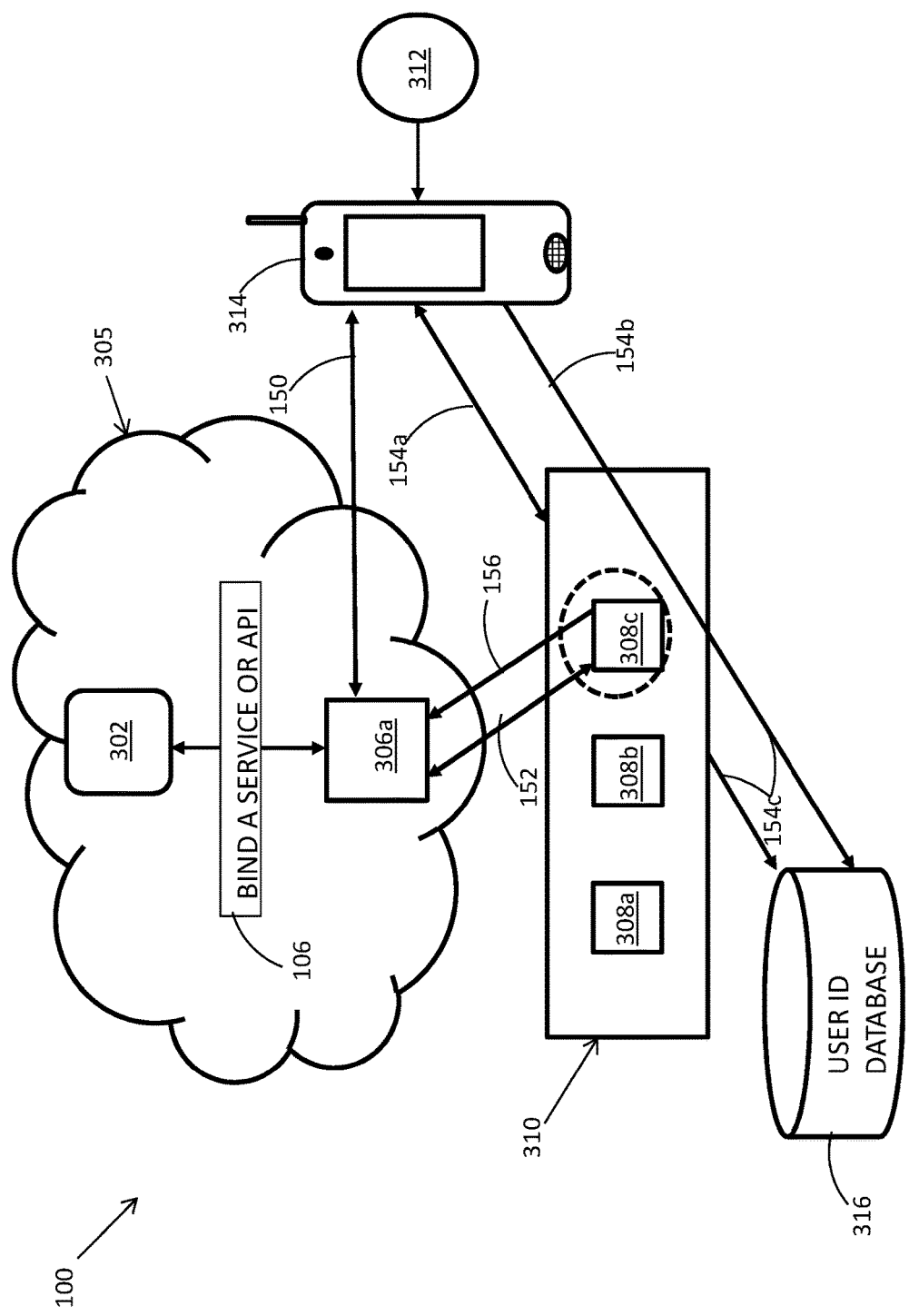
FIG. 4 illustrates a multiple identity resolution system including an IDaaS that captures an identity of a user based on attributes of a user device used to perform authentication for accessing an application according to a non-limiting embodiment.

According to an embodiment, the multiple identity resolution system 100 provides an IDaaS that captures an identity of the user 312 based on attributes of a user device 314 used to perform authentication for accessing an application. With reference to FIG. 4, for example, the user 312 (or service customer 312) initiates activation of the application 306 at operation 150. In response to being activated, the application 306 initiates an authentication procedure.

At operation 152, the application 306 determines the identity sources 308a-308c registered to itself and then presents the user 312 with the available identity sources 308a-308c capable of authenticating the user 312. The application 306 is capable of communicating with service 302. 302 is capable of communicating with the ID source registry module 310, so the application 306 is aware of the various identity sources 308a-308c associated with itself. As described herein, the application 306 can remain updated on all the identity sources 308a-308n available to it.

Turning to operation 154a, the user 312 manipulates the device 314 to select a desired identity source (e.g., indicated by the dashed highlighting around source 308c) among the available identity sources 308a-308c, and inputs the proper authentication credentials (e.g., username, email address, password, etc.) corresponding to the selected identity source (e.g., 308c). The user's inputs are then relayed to the ID source registry module 310, and are authenticated by a server (not shown) corresponding to the selected identity sources 308c. Once the user's credentials are verified, the user is authenticated and is granted access to the application 306.

Still referring to FIG. 4, the multiple identity resolution system 100 includes a user identity (ID) database 316 that is in signal communication with the application 306, the ID source registry module 310, and the device 314. At operation 154b, the device 314 outputs its own device attribute information to the user identity ID database 316. The device attribute information output by the device 314 includes, but is not limited to, a device serial number, an internet protocol (IP) address, device model number, type of device, device operating system version number, device web browser version number, email address linked to a device, device location, location coordinates, web browser plugin data, and wireless service provider information. The device attribute information can be output simultaneously with the user's authentication credentials at operation 154a, or at a different time period, e.g., before or after outputting the user's authentication credentials at operation 154a. In either scenario, the user's authentication credentials and the device's attribute information are received by the user identity ID database 316 and stored therein. The authentication credentials and the device's attribute information can be stored as a user ID table that is automatically updated based on the information delivered by the particular device 314 operated by the user. The user ID table stored in the identity ID database 316 is discussed in greater detail below.

At operation 156, the user's credentials corresponding to the selected identity source 308c are verified. Accordingly, the user can be authenticated using any one of the identity sources 308a-308c in order to gain full access to the application 306.

As described herein, the identity ID database 316 can store a user ID table that organizes various different authentications performed by the user 312. FIGS. 5A-5D illustrates a series of user ID tables 500a-500d that are generated in response to executing different authentications using the IDaaS integrated with the multiple identity resolution system 100 described herein.

Turing to FIG. 5A, a first user ID table 500a (Table 1) is generated in response to the process flow described with respect to FIG. 4. The first user ID table 500a includes a "Device Attribute" column 502, an "Identity source" column 504, an "Application Accessed" column 506, and an "Application User ID" column 508. It should be appreciated that the user ID tables 500a-500d are not limited to any particular number of columns. More or less columns can exist based on the amount and/or type of information to be included in the user ID tables 500a-500d.

The "Device Attribute" column 502 indicates various device attributes output from the device 314 (i.e., operation 154b in FIG. 4). In this scenario, the attribute information output by the device 314 indicates the IP address (e.g., 202.187.3.4), the web browser utilized by the device 314 (e.g., Firefox®), and the geographical location of the device 314 (e.g., Singapore). It can be appreciated that the IP address is unique to each user device, and therefore can be used to detect whether the same user 312 uses more than one device and more than one identity source to activate the application 306.

The "Identity source" column 504 indicates the identity source 308a-308b used to authenticate the user 312 (i.e., operation 152 in FIG. 4). For example, the "Identity source" column 504 may store the identity source 308a-308b as the name of corresponding social media App or service App such as, for example, Facebook®, LinkedIn®, Google®, etc. That is, the "Identity source" column 504 stores which identity source 308a-308c included in the ID source registry module 310 is selected by the user 312.

The "Application Accessed" column 506 indicates which application 306 (e.g. a hotel booking application, music streaming application, etc.) the user 312 desires to activate. As described herein, additional applications beyond application 306 may be integrated with the service 302. Therefore, multiple identity resolution system 100 can monitor and record each individual application to which the user gains access following authentication using the identity sources 308a-308c.

The "Application User ID" column 508 indicates the user ID (e.g., email address) included with the application 306. In some instances, the user 312 may have registered the application 306 under several different accounts. Each account has a different Application User ID. Therefore, column 508 can list the different Application User IDs associated with a particular application 306.

Figure 6:
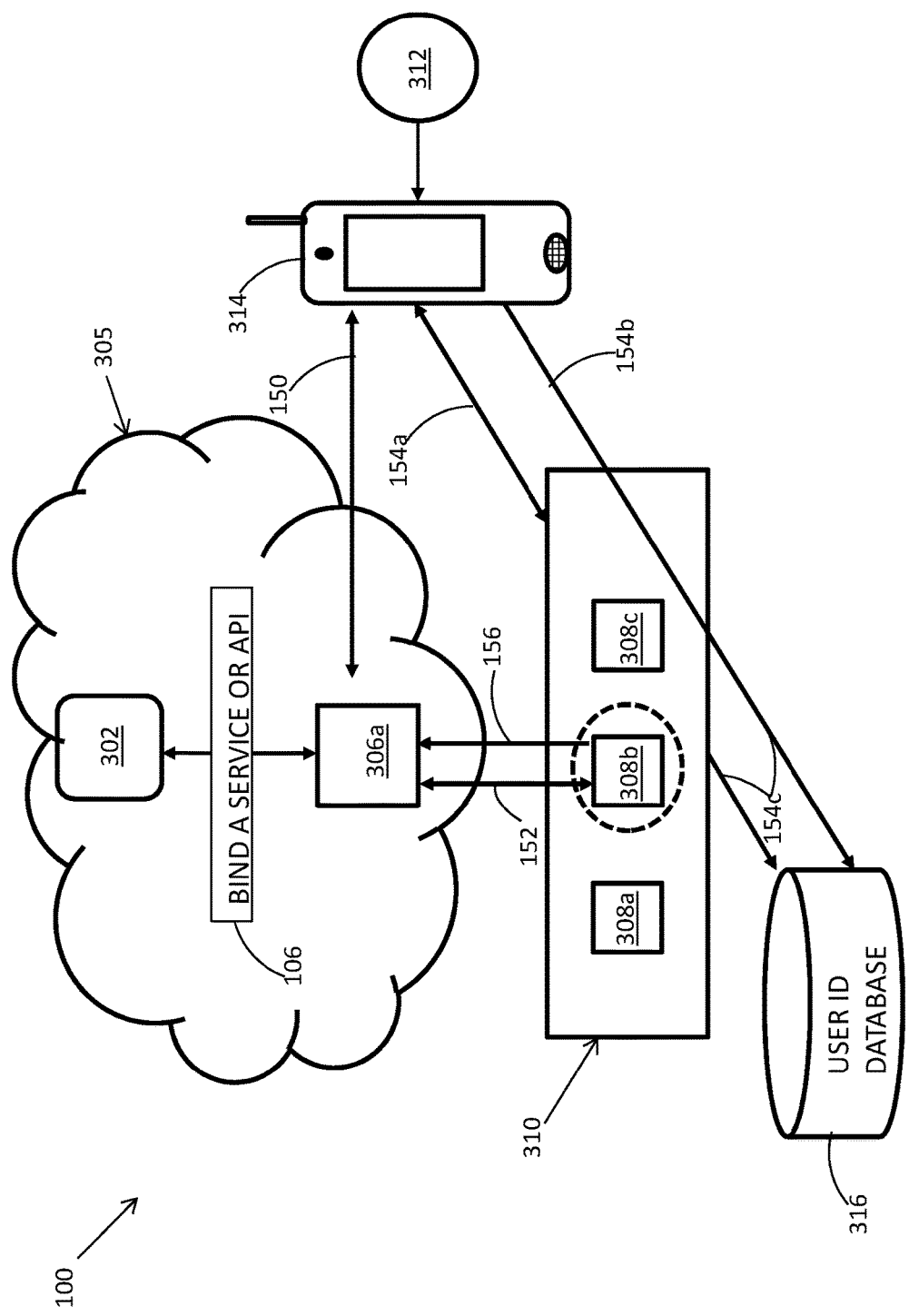
FIG. 6 illustrates a multiple identity resolution system including an IDaaS that captures an identity of a user based on usage of a second identity source to perform a second authentication for accessing the application according to a non-limiting embodiment.

With reference to FIG. 5B, a second user ID table 500b (Table 2) is generated in response to the process flow shown in FIG. 6. Referring to FIG. 6 in greater detail, a scenario is shown where the user 312 performs a second subsequent authentication request. In this scenario, however, the user 312 uses a different identity source 308a-308c to complete the authentication.

For instance, instead of selecting the third identity source 308c (see operation 152 in FIG. 4), the user 312 selects the second identity source 308b (see operation 152 in FIG. 6). The multiple identity resolution system 100 recognizes that a different identity source 308b is being used to gain access to the application 306 because the device attributes are same as an earlier access to application 306 however the identity or the credentials have changed. As a result, the user's authentication credentials (e.g., a username, email address, password, etc.) corresponding to the second identity source 308b are obtained and stored in the user ID database 316. Because a different email address is used to sign into the second identity source 308b, multiple identity resolution system 100 recognizes that a different Application User ID is associated with the application 306, and therefore invokes a second factor authentication process. The second factor authentication process may request the user 312 to input a second Application User ID associated with the second identity source 308b. The second Application User ID (e.g., userA@domain2.com) input by the user 312 is then stored in column 508. Accordingly, the multiple identity resolution system 100 is now aware that a common user 312 has registered the application 306 under two different identity sources (e.g. identity source 308c and identity source 308b) and two different Application User IDs (e.g., userA@domain1.com and userA@domain2.com).

The second factor feature can also include a pre-defined mapping that is performed per user. For instance, a user can be provisioned using a system for cross-domain identity management (SCIM) service or a registry synchronization tool. Secret keys or a phone message can be one of the second factor attributes stored in the User ID table 500a-500d. The second factor feature can also include on the fly mapping. In this instance, a user 312 is sent a request via short message service (SMS) to enter a telephone number. The replied number provided by the user 312 can then be stored in the User ID table 500a-500d as a second factor attribute.

Figure 7:
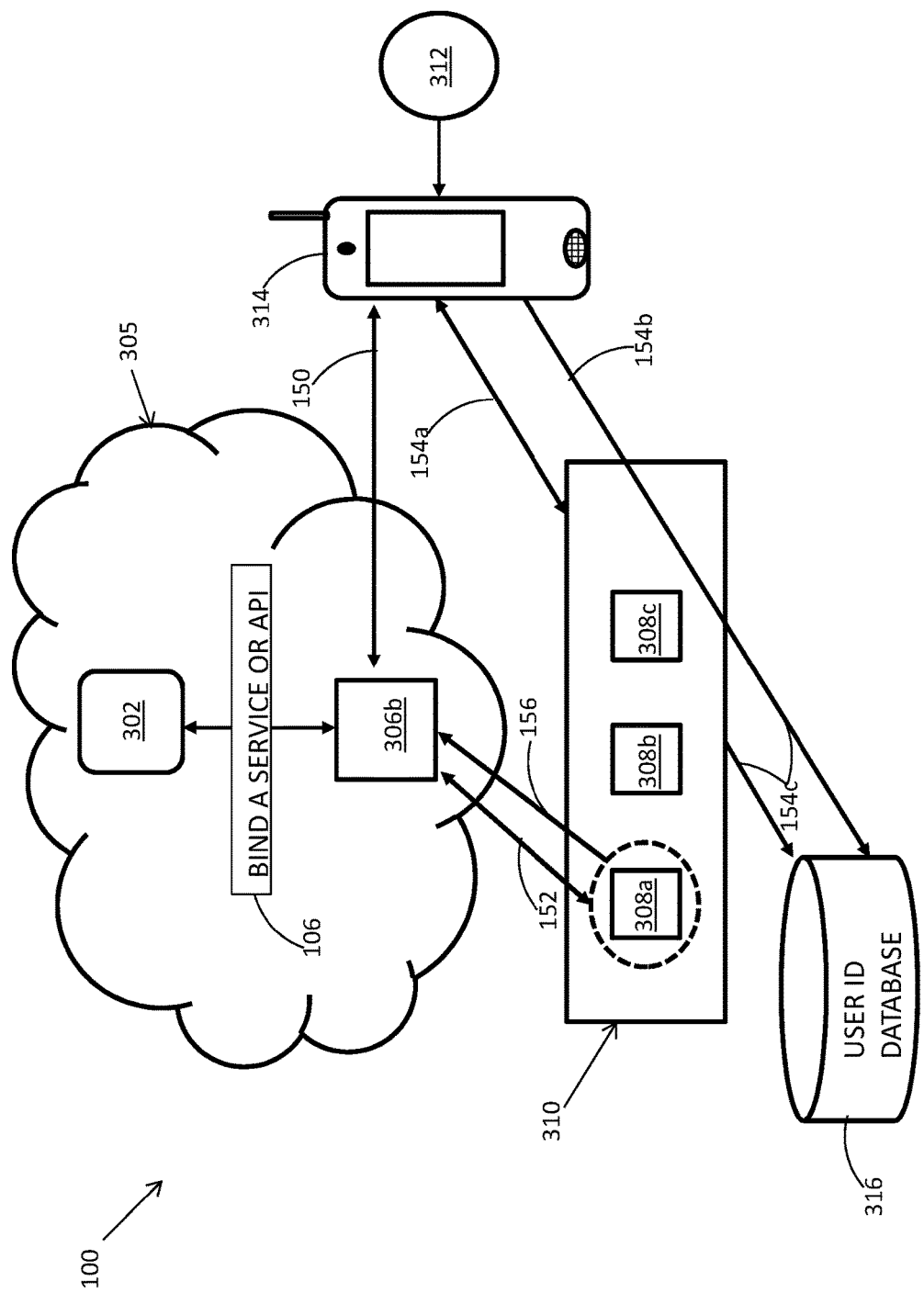
FIG. 7 illustrates a multiple identity resolution system including an IDaaS that captures an identity of a user based on attributes of a user device used to perform authentication by using another identity source b according to a non-limiting embodiment.

With reference to FIG. 5C, a third user ID table 500c (Table 3) is generated in response to the process flow shown in FIG. 7. Referring to FIG. 7 in greater detail, a scenario is shown where the user 312 performs a third subsequent authentication request. In this scenario, however, the user 312 accesses a different application 306b (e.g., Application 2 shown in column 506 of FIG. 5C). Accordingly, the multiple identity resolution system 100 stores the identity source (e.g., source 308a) used to access the second application 306b, and the Application User ID (e.g., userA@domain3.com) associated with the second Application 306b.

Figure 8:
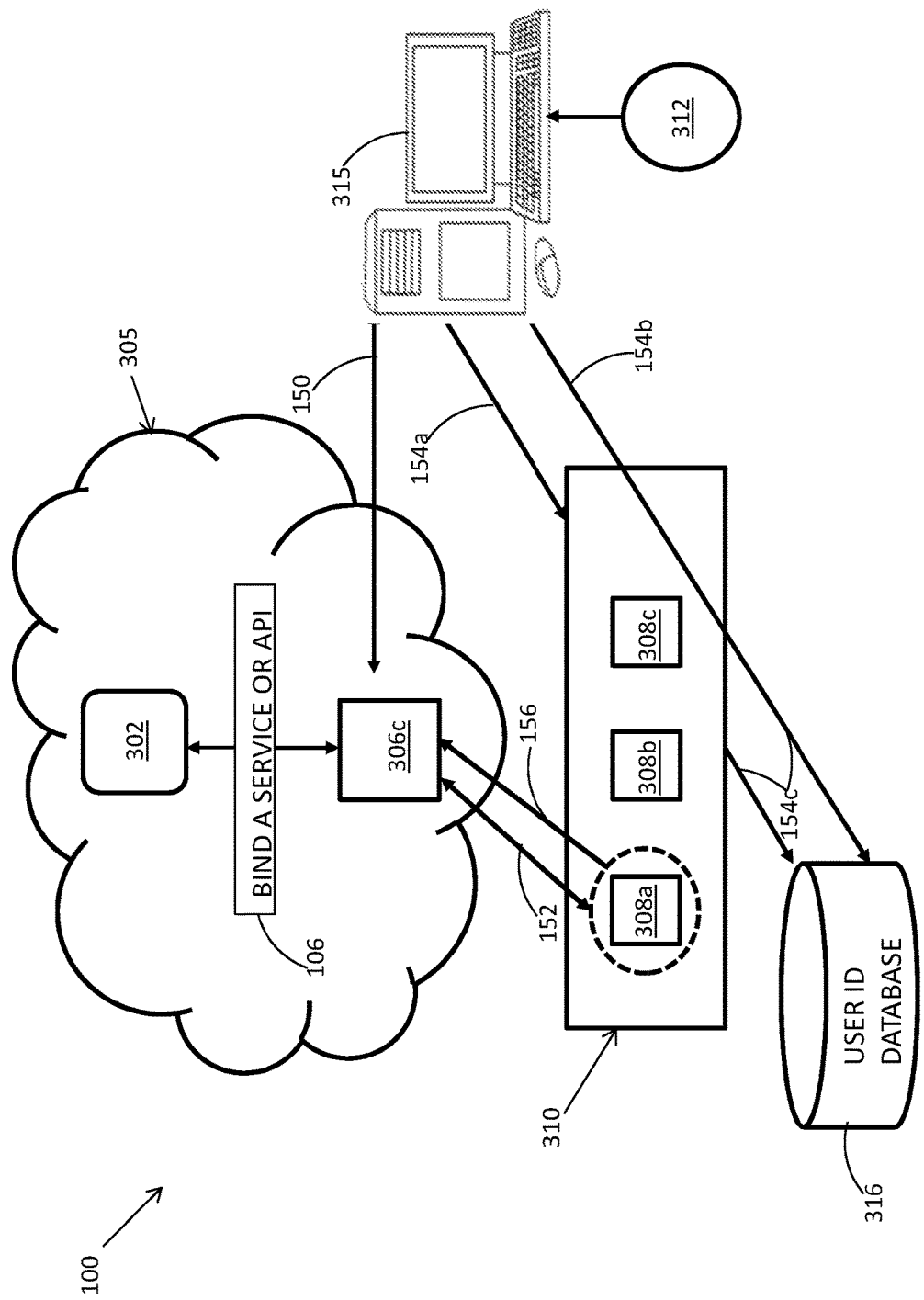
FIG. 8 illustrates a multiple identity resolution system including an IDaaS that captures an identity of a user based on attributes of a second user device used to perform authentication for accessing an application according to a non-limiting embodiment.

With reference to FIG. 5D, a third user ID table 500d (Table 4) is generated in response to the process flow shown in FIG. 8, which illustrates a scenario where the user 312 performs a fourth subsequent authentication request. In this scenario, however, the user 312 accesses a different third application 306*c* using an entirely different device 315. Accordingly, instead of storing the IP address (e.g., 202.187.3.4) associated with device 314 (see FIGS. 4, 6 and 7), the fourth table 500*d* stores an IP address (e.g., 202.187.3.9) associated with the different device 315 (e.g., a desktop computer). Based on a comparison between the User ID and device attributes of the third authentication process (see Table 500*c*) and the User ID and device attributes of the fourth authentication process (see Table 500*d*), the multiple identity resolution system 100 can determine that the same user 312 possess two different devices (e.g., device 314 and device 315) capable of accessing the various applications 306*a*-306*b*. Therefore, the multiple identity resolution system 100 is configured to identify a usage pattern based on the captured data stored in the user ID table 500*a*-500*d* (e.g., device attributes, user id, identity source, etc.) integrates the details of the user 312.

The multiple identity resolution system 100 can further include a heuristic module or heuristic engine integrated in the server module 302. In this manner, the server module 302 can generate heuristic scores corresponding to the captured data. For instance, heuristic scores can be assigned to comparison results between comparisons of captured data. In an embodiment, a group of Application User IDs such as, for example, bsmith@domain1.com, bill.smith@domain2.com and smithb@domain3.com can be assigned a high heuristics score indicating the User IDs belong to a single common user 312. In an embodiment, a group of Application User IDs are determined to be associated with a common user 314 registered to use a particular application 306 when the heuristic score exceeds a threshold value. In some cases, heuristics score can be low, but attributes collected indicate usage of the same device 314. In such cases, the user 312 can manually assist in increasing the heuristics score by indicating usage of the same device 314 with different identities.

Comparison between captured data corresponding to different authentication procedures allows for the establishment of a heuristics system capable of detecting usage patterns of the user 312. For instance, authentication using a common device but with different User IDs associated with different identity sources allows the application 306 to identify a user 312 irrespective of the existence of on several different User IDs. The comparison of the different User IDs described above is only one example.

As described in detail above, various non-limiting embodiments provide a multiple identity resolution system capable of resolving a user identity issue susceptible to applications that allow a user to create multiple accounts using different User IDs. At least one embodiment of the invention identifies device attributes of a device used to activate the application 306. The device attributes can then be mapped to various user authentication credentials input to the identity sources that the user must authenticate before gaining access to the application. In this manner, the multiple identity resolution system can identify a common physical user that has registered a particular application under several different User IDs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "module" refers to an application specific integrated circuit (ASIC), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A multiple identity crisis resolution system including an identity-as-a-service (IDaaS) integrated with a platform-as-as-service (PaaS), the system comprising:
   a cloud-based network;
   an application processor installed in the cloud-based network, the application processor configured to deliver content to at least one electronic device;
   a service processor in signal communication with the application processor, the service processor configured to identify a physical user operating the at least one electronic device based on at least one user authentication credential received by the at least one electronic user device and at least one device attribute of the at least one electronic device; and,
   an ID source registry processor in signal communication with the cloud network, the ID source registry processor configured to store at least one identity source accessible by the at least one electronic device,
   wherein the system service processor detects a first identity source corresponding to a first application access request sent by the at least one electronic device identified by its given IP address and detects a second identity source corresponding to the same application access request sent by the at least one electronic device identified by the given IP address, and outputs a second factor signal to the at least one electronic device indicating detection of a multiple identity crisis of the user in response to the first identity source failing to match the second identity source, and
   wherein the system resolves the multiple identity crisis by requesting a second factor credential from the user, and authenticating an identity of the user in response to matching the second factor credential to a credential that is stored in the ID source registry processor and that is registered to the user.

2. The system of claim 1, wherein the service processor outputs an authentication request signal to the at least one electronic device that requests authentication credentials corresponding to the at least one identity source before granting access to the application processor.

3. The system of claim 2, further comprising a user identification database in signal communication with the cloud based network, the user identification database configured to store the at least one device attribute received from a first electronic device and the at least one user authentication credential sent by the first electronic device.

4. The system of claim 3, wherein the service processor detects a second application access request from a second electronic device different from the first electronic device, and determines that the user is registered to both the first electronic device and the second electronic device when a first identity source selected by the first electronic device to complete a first application access request matches a second identity source selected by the second electronic device to complete the second application access request.

5. The system of claim 2, wherein the service processor detects a first identity source corresponding to a first application access request sent by the first electronic device and receives first device attributes identifying the first electronic device, detects a second identity source corresponding to the same application access request sent by the first electronic device and receives second device attributes matching the first device attributes, and when the first and second device attributes match, the service processor determines that the user has attempted to access the same application processor using different identify sources.

6. The system of claim 3, wherein the server processor generates a score corresponding to at least one of the device attribute and the authentication credential, and determines that at least two different user authentication credentials are associated with a common user registered with the application processor when the score exceeds a threshold value.

7. A method of resolving a multiple identity crisis resolution in a system including an identity-as-a-service (IDaaS) integrated with a platform-as-as-service (PaaS), the method comprising:
   storing, in an ID source registry processor, at least one identity source accessible by the at least one electronic device;
   requesting access to at least one application processor installed in a cloud-based network that is configured to deliver content to at least one electronic device;
   identifying a physical user operating the at least one electronic device based on at least one user authentication credential received from the at least one electronic device and at least one device attribute of the at least one electronic device;
   detecting a first identity source corresponding to a first application access request sent by the at least one electronic device identified by its given IP address and detecting a second identity source corresponding to the same application access request sent by the at least one electronic device identified by the given IP address;
   outputting a second factor signal to the at least one electronic device indicating detection of a multiple identify crisis of the user in response to the first identity source failing to match the second identity source,
   requesting a second factor credential from the user, and
   authenticating an identity of the user in response to matching the second factor credential so as to resolve the multiple identity crisis.

8. The method of claim 7, further comprising:
   detecting a second application access request from a second electronic device different from the first electronic device; and
   determining that the user is registered to both the first electronic device and the second electronic device when a first identity source selected by the first electronic device to complete a first application access request matches a second identity source selected by the second electronic device to complete the second application access request.

9. The method of claim 7, further comprising:
   detecting a first identity source corresponding to a first application access request sent by the first electronic device;
   receiving device attributes from the electronic device associated with conducting the first application access request;
   detecting a second identity source corresponding to a second application access request sent by the first electronic device;
   receiving device attributes from the electronic device associated with conducting the second application access request; and
   determining that the user has attempted to access the same application processor using different identify sources when the device attributes from the electronic device associated with conducting the first application access request match the device attributes from the electronic device associated with conducting the second application access request.

10. The method of claim 7, further comprising:
    determining at least one of a device attribute and an authentication credential;
    generating a score corresponding to at least one of the device attribute and the authentication credential; and
    determining that at least two different user authentication credentials are associated with a common user registered with the application processor when the score exceeds a threshold value.

11. The method of claim 7, wherein the second factor credential is a second authentication credential different from the at least one authentication credential.

12. A computer program product comprising a computer readable storage medium having program instructions for resolving a multiple identity crisis resolution in a system including an identity-as-a-service (IDaaS) integrated with a platform-as-as-service (PaaS), the program instructions executable by a processor to perform operations of:
    storing, in an ID source registry processor, at least one identity source accessible by the at least one electronic device;
    requesting access to at least one application processor installed in a cloud-based network that is configured to deliver content to at least one electronic device;
    identifying a physical user operating the at least one electronic device based on at least one user authentication credential received from the at least one electronic device and at least one device attribute of the at least one electronic device;
    detecting a first identity source corresponding to a first application access request sent by the at least one electronic device identified by its given IP address and detecting a second identity source corresponding to the same application access request sent by the at least one electronic device identified by the given IP address;
    outputting a second factor signal to the at least one electronic device indicating detection of a multiple identify crisis of the user in response to the first identity source failing to match the second identity source,
    requesting a second factor credential from the user, and
    authenticating an identity of the user in response to matching the second factor credential so as to resolve the multiple identity crisis.

13. The computer program product of claim 12, wherein the operations further comprise:
    detecting a second application access request from a second electronic device different from the first electronic device; and
    determining that the user is registered to both the first electronic device and the second electronic device when a first identity source selected by the first electronic device to complete a first application access request matches a second identity source selected by the second electronic device to complete the second application access request.

14. The computer program product of claim 12, wherein the operations further comprise:

detecting a first identity source corresponding to a first application access request sent by the first electronic device;

receiving device attributes from the electronic device associated with conducting the first application access request;

detecting a second identity source corresponding to a second application access request sent by the first electronic device;

receiving device attributes from the electronic device associated with conducting the second application access request; and determining that the user has attempted to access the same application processor using different identify sources when the device attributes from the electronic device associated with conducting the first application access request match the device attributes from the electronic device associated with conducting the second application access request.

15. The computer program product of claim 12, wherein the operations further comprise:

determining at least one of a device attribute and an authentication credential;

generating a score corresponding to at least one of the device attribute and the authentication credential; and determining that at least two different user authentication credentials are associated with a common user registered with the application processor when the score exceeds a threshold value.

16. The computer program product of claim 12, wherein the second factor credential is a second authentication credential different from the at least one authentication credential.

* * * * *